H. DORNBURGH.
SHEARS.

No. 176,520. Patented April 25, 1876.

WITNESSES:
C. Neveux
John Goethals

INVENTOR:
H. Dornburgh
BY
[signature]
ATTORNEYS.

UNITED STATES PATENT OFFICE.

HENRY DORNBURGH, OF OLMSTEADVILLE, NEW YORK.

IMPROVEMENT IN SHEARS.

Specification forming part of Letters Patent No. 176,520, dated April 25, 1876; application filed March 21, 1876.

*To all whom it may concern:*

Be it known that I, HENRY DORNBURGH, of Olmsteadville, Essex county, New York, have invented a new and Improved Shears, of which the following is a specification:

My invention consists of a bar for the support of the pivot, supported on one of the blades outside of the other blade, so that the pivot has a bearing at each end, and sustains the strain in the middle, in such manner that in connection with broad bearings the blades are prevented from opening laterally along the edges, as they do when the pivot goes through one blade and screws into the other.

Figure 1:
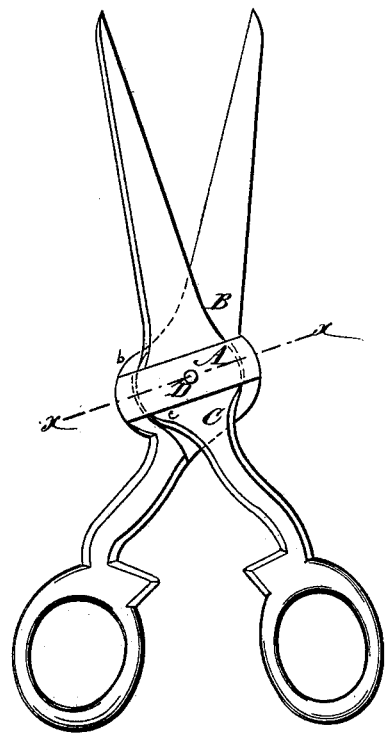
Figure 2:

Figure 1 is a plan view of my improved shears, and Fig. 2 is a section on the line $x$ $x$.

Similar letters of reference indicate corresponding parts.

A represents the bar, which is attached to the blade B on opposite sides of the blade C, and supports one end of the pivot D, while the other end is supported in the blade B, the blades being constructed with broad bearings $b\ c$ around the pivot-holes, so that the pivot is prevented from wabbling, and the blades are retained in their positions relatively to each other.

Having thus described my invention, I claim as new and desire to secure by Letters Patent—

The combination of bar A and broad bearings $b\ c$ with pivot D, to prevent the shears from turning and cutting each other, thereby injuring the edges.

HENRY DORNBURGH.

Witnesses:
CHARLES McINTYRE,
E. H. TALBOT.